United States Patent
Lin

(10) Patent No.: US 12,501,907 B1
(45) Date of Patent: Dec. 23, 2025

(54) POULTRY STUN DETECTION SYSTEM AND METHOD

(71) Applicant: National Chung Hsing University, Taichung (TW)

(72) Inventor: Hao-Ting Lin, Taichung (TW)

(73) Assignee: NATIONAL CHUNG HSING UNIVERSITY, Taichung (TW)

(*) Notice: Subject to any disclaimer, the term of this patent is extended or adjusted under 35 U.S.C. 154(b) by 0 days.

(21) Appl. No.: 18/918,289

(22) Filed: Oct. 17, 2024

(51) Int. Cl.
| | |
|---|---|
| A22B 3/08 | (2006.01) |
| A22B 3/00 | (2006.01) |
| A22B 3/02 | (2006.01) |
| A22B 3/06 | (2006.01) |
| G06V 10/82 | (2022.01) |
| G06V 40/10 | (2022.01) |
| H04N 7/18 | (2006.01) |
| A22C 21/00 | (2006.01) |

(52) U.S. Cl.
CPC .............. *A22B 3/086* (2013.01); *A22B 3/005* (2013.01); *A22B 3/02* (2013.01); *A22B 3/06* (2013.01); *G06V 10/82* (2022.01); *G06V 40/10* (2022.01); *H04N 7/181* (2013.01); *A22C 21/0046* (2013.01); *A22C 21/0061* (2013.01)

(58) Field of Classification Search
CPC ........... A22B 3/086; A22B 3/005; A22B 3/02; A22B 3/06; G06V 10/82; G06V 40/10; H04N 7/181; A22C 21/0046; A22C 21/0061
USPC ...................................... 348/159; 452/57, 58
See application file for complete search history.

(56) References Cited

U.S. PATENT DOCUMENTS

| | | | |
|---|---|---|---|
| 7,249,998 B2 * | 7/2007 | van Esbroeck | A22B 5/0088 452/58 |
| 2009/0227191 A1 * | 9/2009 | Tseng | A22B 3/06 452/58 |
| 2025/0005733 A1 * | 1/2025 | Kidd | G06N 3/0464 |

FOREIGN PATENT DOCUMENTS

CN 103729623 A * 4/2014

* cited by examiner

*Primary Examiner* — Thai Q Tran
*Assistant Examiner* — Stephen R Smith
(74) *Attorney, Agent, or Firm* — Muncy, Geissler, Olds & Lowe, P.C.

(57) ABSTRACT

A poultry stun detection system is designed for using with a poultry slaughter platform, wherein the poultry stunning detection system includes at least: a first camera device, a second camera device, a network transmission device, and a computer processing device. The poultry stun detection system utilizes visual devices to immediately determine whether the stunned poultry still has perception in real time, and employs the YOLOv4 deep learning model to enhance the recognition accuracy of whether the poultry has lost its consciousness after stunning.

10 Claims, 3 Drawing Sheets

POULTRY STUN DETECTION SYSTEM AND METHOD

TECHNICAL FIELD

The invention relates to a recognition system that utilizes visual devices to immediately determine whether poultry still has consciousness after becoming unconscious. Specifically, it is a poultry stun detection system and method that employs a YOLOv4 deep learning model to enhance the identification of whether the unconscious poultry has lost consciousness.

BACKGROUND

Present awareness and regulations regarding animal welfare in the society are increasingly improving. Therefore, the treatment of the poultry before slaughter is receiving more attention. Currently, stunning is regarded as an important aspect of animal welfare prior to poultry slaughter, as it ensures that the poultry do not feel pain during the slaughter process and reduces their stress responses.

Stunning, also known as knockout or stunning knockout, knockout, refers to methods that render animal unconscious through physical, gas, or chemical means, ensuring that they do not regain consciousness during slaughter processes. In addition to being an important aspect of animal welfare, stunning also helps reduce bodily injuries and suffering caused by struggling during poultry slaughter, thereby improving work efficiencies and enhancing qualities of poultry meats and working environments. Conversely, if poultry are not stunned or are inadequately stunned before slaughter, their brain nerves will be subjected to intense stimuli such as fear and pain, causing visceral contraction and blood pooling in the muscles, which will lead to incomplete bleeding and ultimately reduce the quality of the meat.

As mentioned above, stunning is a necessary process in poultry slaughter. However, because each poultry's weight, body size, shape, and posture is not the same, accurately distinguishing between those that have lost consciousness and are in a stunned state and those that still have awareness in the first moments of the slaughter process is one of the pressing issues that both academia and industry seek to address.

SUMMARY

To address the aforementioned issues, the present invention provides a poultry stun detection system and method that enhances the recognition accuracy of determining whether stunned poultry has lost its consciousness status through the YOLOv4 deep learning model, enabling immediate assessment of whether the poultry still has perception in real time.

A poultry stun detection system disclosed in the embodiment of the present invention is designed for using with a poultry slaughter platform, wherein the poultry stun detection system includes at least: a first camera device, a second camera device, and a network transmission device and computer processing device. The first camera device is installed in a water bath area in the poultry slaughtering platform to take images of one or more poultry before they enter the water bath area and the images of one or more poultry entering the water bath area for electric stunning, and generates a first image signal based on the images. a second camera device is installed in a bloodletting area in the poultry slaughter platform to capture images of one or more poultry after being stunned by electric shock, and generate a second image signal based on the image. a network transmission device transmits the first image signal and the second image signal. a computer processing device receives the first image signal and the second image signal, inputs the first image signal and the second image signal to a plurality of image enhancement programs, and then outputs a plurality of image enhancement signals, and then the plurality of image enhancement signals is input into a YOLOv4 deep learning model, and the YOLOv4 deep learning model is used to obtain a confidence threshold, an intersection over union threshold, one or more prediction boxes and one or more ground truth boxes, and at first use the confidence threshold to filter out one or more predicted boxes with lower confidence, then assess one or more predicted boxes with confidence higher than the confidence threshold for the confidence threshold for the degree of overlap with one or more ground truth boxes to determine whether it exceeds or falls below the intersection over union threshold, and based on the comparison, it is determined whether the one or more poultry have reached the state of unconsciousness after being stunned, and the judgment result is then output as a prediction signal for confirmation by relevant personnel.

The steps of the poultry stun detection method disclosed in the embodiment of the present invention at least include the following: Step 1: using a first camera device to capture images of one or more poultry before they are stunned and images of the process of being stunned, then generating a first image signal based on these images; Step 2: using a second camera device to capture images of the one or more poultry after being stunned, then generating a second image signal based on the image; Step 3: then using a network transmission device to transmit the first image signal and the second image signal to a computer processing device; Step 4: the computer processing device will perform a plurality of image enhancement processes on the first image signal and the second image signal, and then output a plurality of image enhancement signals; Step 5: Inputting the plurality of image enhancement signals to a YOLOv4 deep learning model to obtain a confidence threshold, an intersection over union threshold, one or more prediction boxes and one or more ground truth boxes after the poultry is stunned, and first, use the confidence threshold to filter out one or more prediction boxes with lower confidence, then, one or more predicted boxes with confidence higher than the confidence threshold are assessed for the degree of overlap with one or more ground truth boxes to determine whether it exceeds or falls below the intersection over union threshold, and based on the comparison, it is determined whether the one or more poultry have reached the state of unconsciousness after being stunned, and the judgment result is then output as a prediction signal for confirmation by relevant personnel.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
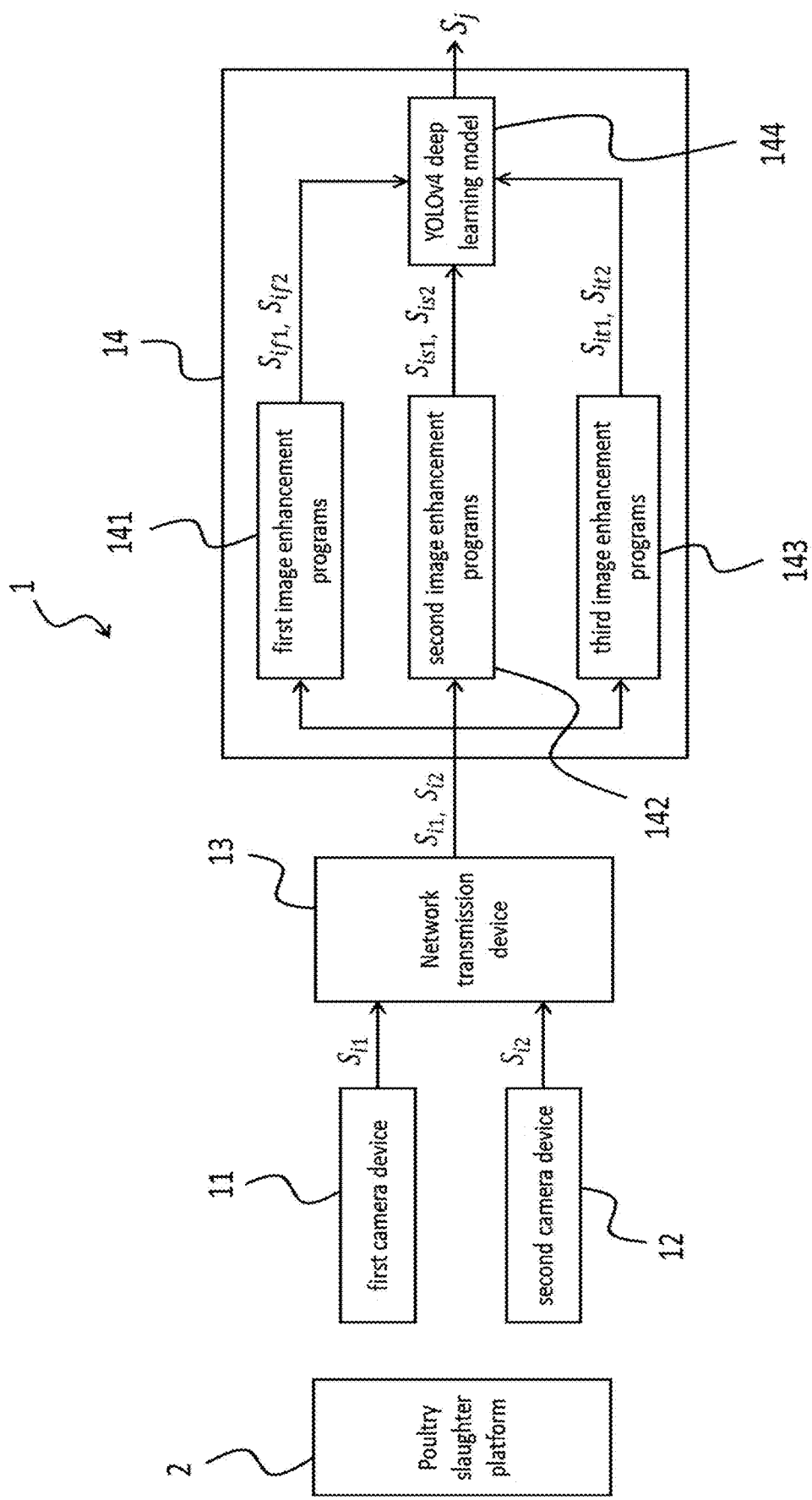
FIG. 1 is a schematic diagram of the structure of the poultry stun detection system described in the embodiment of the present invention.

In the following detailed description, we will illustrate embodiments of the present invention with reference to the accompanying drawings and examples. The illustrations provided are intended to schematically demonstrate the basic concept of the present invention. While the components depicted in the drawings represent relevant components of the present invention, it should be noted that their number, shape, and size may vary in practical implementation.

Figure 2:
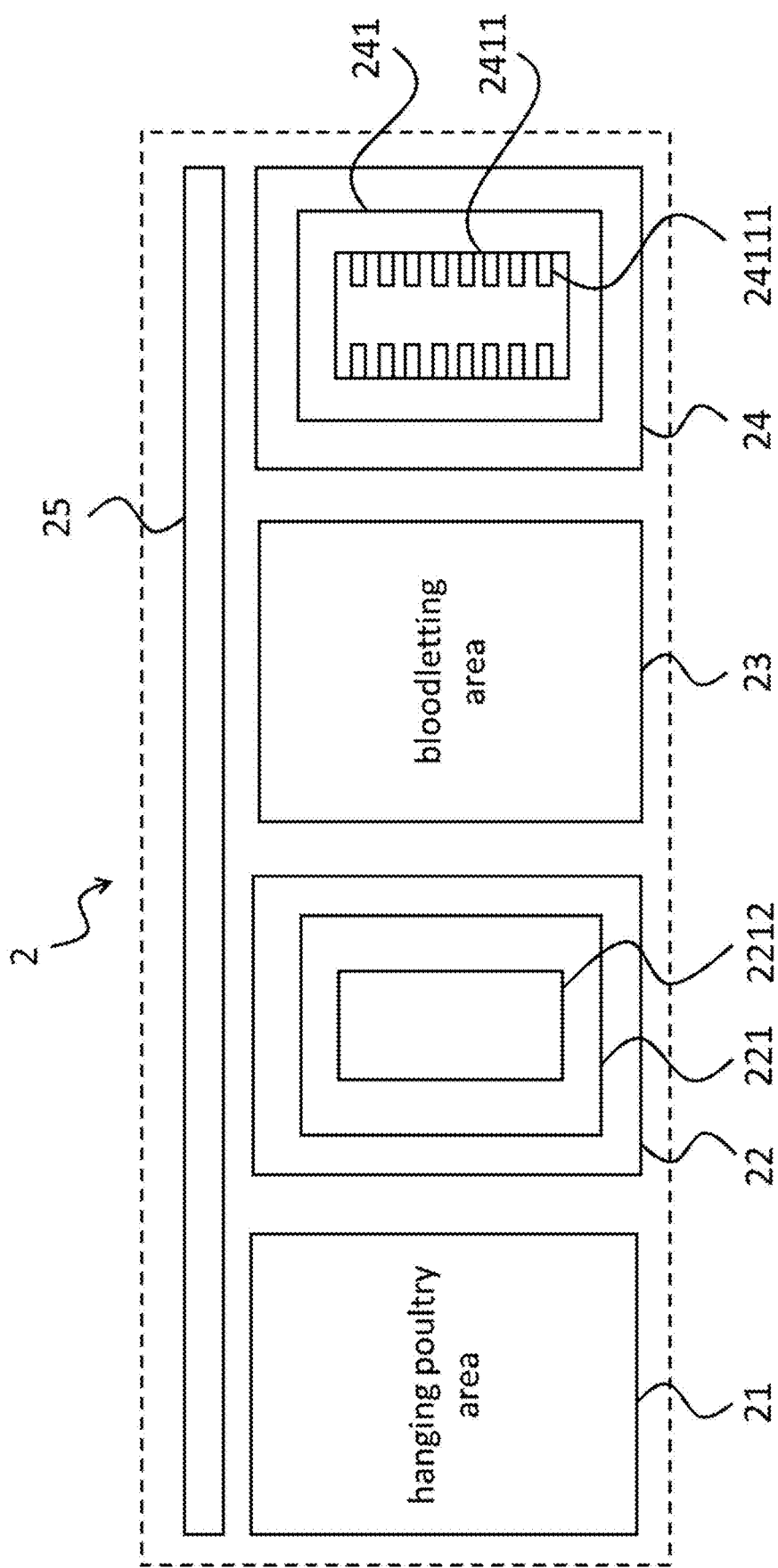
FIG. 2 is a schematic diagram of the structure of the poultry slaughter platform described in the embodiment of the present invention.
Figure 3:
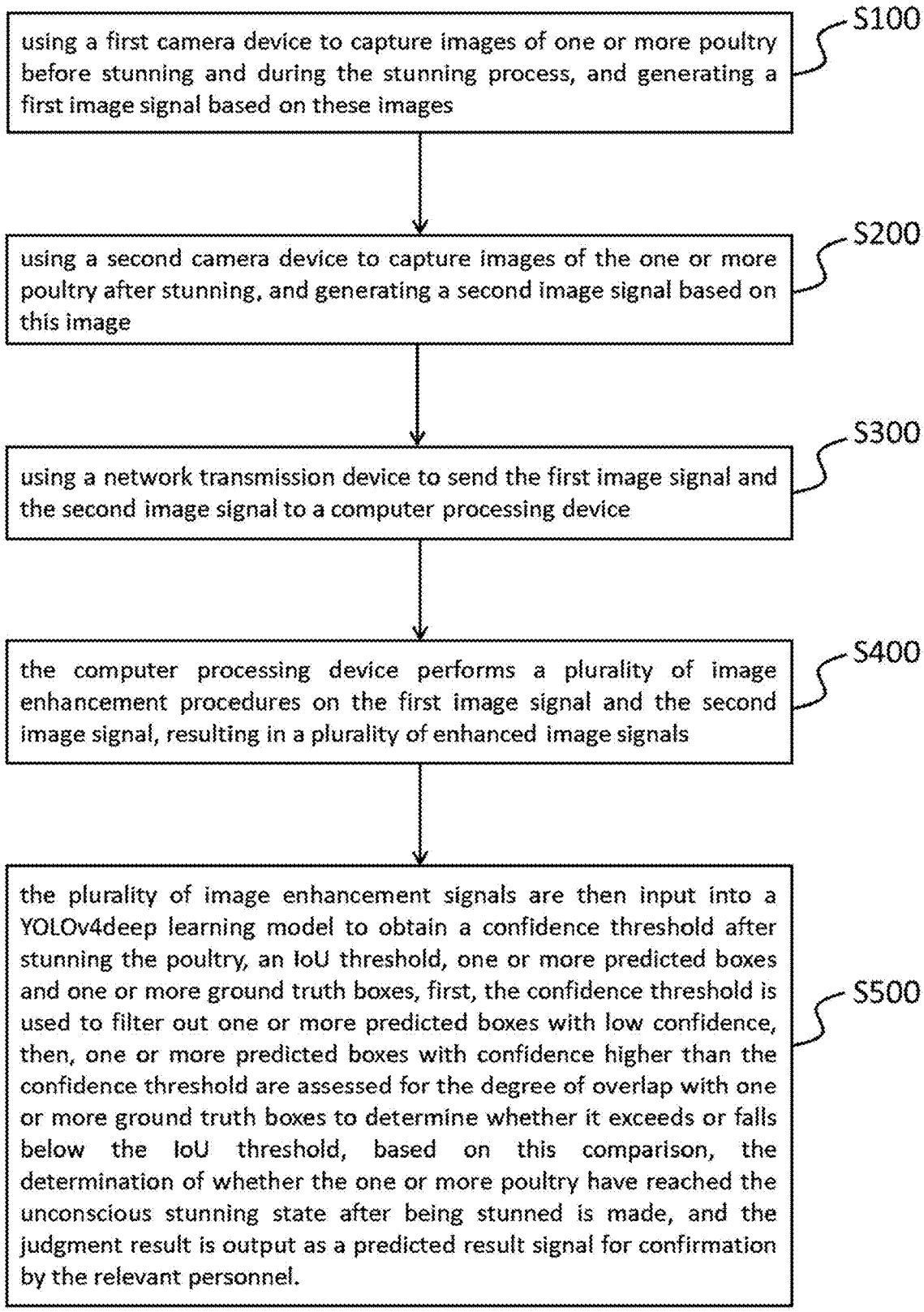
FIG. 3 is a schematic diagram of the step flow of the poultry stun detection method described in the embodiment of the present invention.

Please refer to FIG. 1 and FIG. 2. FIG. 1 is a schematic diagram of the structure of the poultry stun detection system 1 described in the embodiment of the present invention, and FIG. 2 is a schematic diagram of the structure of the poultry slaughter platform 2 described in the embodiment of the present invention.

The embodiment of the present invention discloses a poultry stun detection system 1 that is used with a poultry slaughter platform 2, wherein the poultry stun detection system 1 includes a first camera device 11, a second camera device 12, a network transmission device 13, and a computer processing device 14.

In the embodiment of the present invention, the first camera device 11 and the second camera device 12 are connected to the network transmission device 13 via electrical connections, wired connections or wireless connections. The network transmission device 13 is connected to the computer processing device 14 via electrical connections, wired connections or wireless connections. Furthermore, the first camera device 11 and the second camera device 12 are placed in different areas of the poultry slaughter platform 2 to capture images of one or more poultry from different angles on the poultry slaughter platform 2.

In the embodiment of the present invention, the poultry slaughter platform 2 includes a hanging poultry area 21, a water bath area 22, a bloodletting area 23, and a feather removal area 24. Additionally, the poultry slaughter platform 2 further includes a hanging rack 25, which is used to suspend one or more poultry, allowing the poultry to move sequentially through the hanging poultry area 21, the water bath area 22, the bloodletting area 23, and the feather removal area 24.

The water bath area 22 includes a water bath tank 221, which is equipped with an electrical stunning device 2211 that is designed to stun one or more poultry. The negative terminal of the electrical stunning device 2211 is electrically connected to the hanging rack 211, while the positive terminal is electrically connected to the water bath tank 221.

The feather removal area 24 includes a feather removal device 241, which is equipped with a drum 2411 containing a plurality of soft plastic columns 24111.

The embodiment of the poultry slaughter platform 2 in the present invention is as follows: First, one or more poultry are hung in an upside-down position, with their feet facing up and heads facing down, in the hanging poultry area 21 on the hanging rack 25. Through the hanging rack 25, the one or more poultry are slid to the water bath area 22. When the heads of the one or more poultry come into contact with the water in the water bath 221, electrical stunning is performed.

After that, the stunned poultry are slid to the bloodletting area 23 for bleeding, and then the bled poultry are moved to the feather removal area 24. The one or more poultry are placed into the drum 2411 of the feather removal device 241 for high-speed rotation, allowing the one or more poultry to collide with the plurality of soft plastic columns 24111 inside the drum 2411, thereby achieving the effect of feather removal.

The poultry stun detection system 1 disclosed in the embodiment of the present invention is designed with the first camera device 11 placed within the water bath area 22, used to capture images of one or more poultry before they enter the water bath 221 and during the process of being electrically stunned in the water bath 221, thereby generating a first image signal $S_{i1}$ based on these images. The second camera device 12 is set up within the bloodletting area 23 to capture images of the one or more poultry after they have been electrically stunned, producing a second image signal $S_{i2}$ based on these images. The first image signal $S_{i1}$ and the second image signal $S_{i2}$ are transmitted to the computer processing device 14 through the network transmission device 13. Then, through a plurality of image enhancement programs within the computer processing device 14 (such as the first image enhancement program 141, the second image enhancement program 142, and the third image enhancement program 143), a plurality of image enhancement signals (for example, the first image enhancement signal $S_{ij1}$, the second image enhancement signal $S_{ij2}$, the third image enhancement signal $S_{is1}$, the fourth image enhancement signal $S_{is2}$, the fifth image enhancement signal $S_{it1}$, and the sixth image enhancement signal $S_{it2}$) are output. The plurality of image enhancement signals are then input into a YOLOv4 (full name: You Only Look Once version 4) deep learning model 144 to utilize the YOLOv4 deep learning model 144 in order to obtain a confidence threshold after stunning the poultry, an Intersection over Union (abbreviated as IoU) threshold, one or more predicted boxes and one or more ground truth boxes. First, the confidence threshold (generally taken as a threshold value of 0.5, 0.75, or between 0.5 and 0.75) is used to filter out one or more predicted boxes with low confidence. Then, the degree of overlap between one or more predicted boxes and one or more ground truth boxes is assessed to determine whether it exceeds or falls below the IoU threshold (also generally taken as a threshold value of 0.5, 0.75, or between 0.5 and 0.75). The judgment result is then output as a predicted result signal $S_j$ for confirmation by the relevant personnel.

When the degree of overlap between the one or more predicted boxes and the one or more ground truth boxes is greater than or equal to the IoU threshold, the predicted result signal $S_j$ will indicate that the poultry has reached a state of unconsciousness. Conversely, when the degree of overlap is less than the IoU threshold, the predicted result signal $S_j$ will indicate that the poultry has not yet reached a state of unconsciousness.

The first image enhancement program 141 is an HSV color jittering, which adjusts a Hue, a Saturation, and a Value of the first image signal $S_{i1}$ and the second image signal $S_{i2}$. Through the HSV color jittering, the YOLOv4 deep learning model 144 can cope with variations in lighting and tones in different poultry images. Here, the hue represents the color, the saturation indicates the degree to which the color approaches a spectral color, and the value reflects the intensity of the color. The second image enhancement program 142 is a horizontal flipping, which performs a horizontal flip on the first image signal $S_{i1}$ and the second image signal $S_{i2}$. The horizontal flipping allows the YOLOv4 deep learning model 144 to learn features that are the opposite of those in the poultry images. The third image enhancement program 143 is a random scaling method, which applies random scaling to the first image signal $S_{i1}$ and the second image signal $S_{i2}$. Through this random scaling, the YOLOv4 deep learning model 144 can adapts to poultry images of different sizes.

The predicted result signal $S_j$ categorizes the predicted data into a True Positive (TP), a True Negative (TN), a False Positive (FP), and a False Negative (FN). The True Positive refers to when it is predicted that the poultry has been stunned, and it has indeed been stunned. The True Negative refers to when it is predicted that the poultry has not been stunned, and it indeed has not been stunned. The False Positive refers to when it is predicted that the poultry has been stunned, but it actually has not been stunned. The False Negative refers to when it is predicted that the poultry has not been stunned, but it actually has been stunned.

The aforementioned predicted result signal $S_j$ is primarily evaluated using five metrics: accuracy, precision, recall, Intersection over Union (IoU), and mean Average Precision (mAP). The mathematical expressions for these five metrics are as follows:

$$\text{accuracy} = \frac{\text{True Positive (TP)} + \text{True Negative (TN)}}{\text{True Positive (TP)} + \text{True Negative (TN)} + \text{False Positive (FP)} + \text{False Negative (FN)}}$$

For the predicted result signal $S_j$, accuracy is defined as: all predicted results are the same as the actual results.

$$\text{precision} = \frac{\text{True Positive (TP)}}{\text{True Positive (TP)} + \text{False Positive (FP)}}$$

For the predicted result signal $S_j$, precision is defined as: how many of the true positive samples are predicted correctly. Therefore, when precision increases, it indicates that the identification results are good, with 1 being the ideal state.

$$\text{recall} = \frac{\text{True Positive (TP)}}{\text{True Positive (TP)} + \text{False Negative (FN)}}$$

For the predicted result signal $S_j$, recall is defined as: how many of the actual true positive samples are correctly identified. Therefore, a higher recall indicates better identification results, with 1 being the ideal state.

$$IoU(\text{Intersection over Union}) = \frac{R \cap \hat{R}}{R \cup \hat{R}}$$

IoU stands for Intersection Over Union, which means "the intersection over the union," and is abbreviated as "IoU ratio." Here, R represents the predicted bounding box, while $\hat{R}$ represents the ground truth bounding box. The value of IoU ranges from [0, 1]; when IoU is closer to 1, it indicates that the overlapping area between the two windows is larger, resulting in better localization accuracy. Conversely, a lower value indicates poorer accuracy. In this example, thresholds of 0.5, 0.75, or a range of 0.5 to 0.75 are used as the boundary for IoU. For instance, when a threshold of 0.5 is applied, an IoU value of ≥0.5 indicates the true positive, while an IoU value of <0.5 indicates the false positive.

$$mAP(\text{mean Average Precision}) = \frac{\sum_{C=1}^{C} AP(C)}{C}$$

For the predicted result signal $S_j$, mAP (mean Average Precision) is the average of the AP values across all classes. AP is calculated as the area under the precision-recall curve. Let C be the number of classes being detected. Since this example is only for detecting poultry, the value of C is this example is 1. Therefore, a higher mAP indicates that the predictive performance of the predicted result signal $S_j$.

The poultry stun detection method disclosed in this embodiment of the invention includes the following steps:

Step 1 (S100): using a first camera device to capture images of one or more poultry before stunning and during the stunning process, and generating a first image signal based on these images;

Step 2 (S200): using a second camera device to capture images of the one or more poultry after stunning, and generating a second image signal based on this image;

Step 3 (S300): using a network transmission device to send the first image signal and the second image signal to a computer processing device;

Step 4 (S400): the computer processing device performs a plurality of image enhancement procedures on the first image signal and the second image signal, resulting in a plurality of enhanced image signals;

Step 5 (S500): the plurality of image enhancement signals are then input into a YOLOv4 deep learning model to obtain a confidence threshold after stunning the poultry, an IoU threshold, one or more predicted boxes and one or more ground truth boxes, first, the confidence threshold is used to filter out one or more predicted boxes with low confidence, then, one or more predicted boxes with confidence higher than the confidence threshold are assessed for the degree of overlap with one or more ground truth boxes to determine whether it exceeds or falls below the IoU threshold, based on this comparison, the determination of whether the one or more poultry have reached the unconscious stunning state after being stunned is made, and the judgment result is output as a predicted result signal for confirmation by the relevant personnel.

In this embodiment of the invention, the means for stunning one or more poultry includes not only the previously mentioned electric stunning, but also methods such as mechanical stunning (striking the head), percussive stunning, chemical stunning, or controlled atmosphere stunning (CAS), among others, but this is not a limitation.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A poultry stun detection system is designed for using with a poultry slaughter platform, wherein the poultry stun detection system includes at least:

a first camera device is installed in a water bath area in the poultry slaughtering platform to take images of one or more poultry before they enter the water bath area and the images of one or more poultry entering the water bath area for electric stunning, and generates a first image signal based on the images;

a second camera device is installed in a bloodletting area in the poultry slaughter platform to capture images of one or more poultry after being stunned by electric shock, and generate a second image signal based on the image;

a network transmission device transmits the first image signal and the second image signal;

a computer processing device receives the first image signal and the second image signal, inputs the first image signal and the second image signal to a plurality of image enhancement programs, and then outputs a plurality of image enhancement signals, and then the plurality of image enhancement signals is input into a YOLOv4 deep learning model, and the YOLOv4 deep learning model is used to obtain a confidence threshold, an intersection over union threshold, one or more prediction boxes and one or more ground truth boxes, and at first use the confidence threshold to filter out one or more predicted boxes with lower confidence, then assess one or more predicted boxes with confidence higher than the confidence threshold for the confidence threshold for the degree of overlap with one or more ground truth boxes to determine whether it exceeds or falls below the intersection over union threshold, and based on the comparison, it is determined whether the one or more poultry have reached the state of unconsciousness after being stunned, and the judgment result is then output as a prediction signal for confirmation by relevant personnel.

2. The poultry stun detection system according to claim 1, wherein the poultry slaughter platform includes at least a hanging poultry area, a water bath area, a bleeding area, and a feather removal area.

3. The poultry stun detection system according to claim 2, wherein the poultry slaughter platform further comprises a hanging rack that move sequentially through the hanging poultry area, the water bath area, the bleeding area, and the feather removal area.

4. The poultry stun detection system according to claim 3, wherein the water bath area includes a water bath equipped with an electrification device, a negative terminal of which is electrically connected to the hanging rack, and a positive terminal of which is electrically connected to the water bath.

5. The poultry stun detection system according to claim 2, wherein the feather removal area includes a feather removal device that is equipped with a drum containing a plurality of soft plastic columns.

6. The poultry stun detection system according to claim 1, wherein the plurality of image enhancement processes includes at least an HSV color jitter that adjusts a hue, a saturation, and a brightness in the first image signal and the second image signal.

7. The poultry stun detection system according to claim 1, wherein the plurality of image enhancement processes include at least a horizontal flipping that performs a horizontal flip on the first image signal and the second image signal.

8. The poultry stun detection system according to claim 1, wherein the plurality of image enhancement processes includes at least a random scaling that performs random scaling on the first image signal and the second image signal.

9. A poultry stun detection method, the steps of which are at least as follows:

Step 1: using a first camera device to capture image of one or more poultry before they are stunned and images of the process of being stunned, then generating a first image signal based on these images;

Step 2: using a second camera device to capture the image of the one or more poultry after being stunned, then generating a second image signal based on the image;

Step 3: then using a network transmission device to transmit the first image signal and the second image signal to a computer processing device;

Step 4: the computer processing device will perform a plurality of image enhancement processes on the first image signal and the second image signal, and then output a plurality of image enhancement signals;

Step 5: Inputting the plurality of image enhancement signals to a YOLOv4 deep learning model to obtain a confidence threshold, an intersection over union threshold, one or more prediction boxes and one or more ground truth boxes after the poultry is stunned, and first, use the confidence threshold to filter out one or more prediction boxes with lower confidence, then, one or more predicted boxes with confidence higher than the confidence threshold are assessed for the degree of overlap with one or more ground truth boxes to determine whether it exceeds or falls below the intersection over union threshold, and based on the comparison, it is determined whether the one or more poultry have reached the state of unconsciousness after being stunned, and the judgment result is then output as a prediction signal for confirmation by relevant personnel.

10. The poultry stun detection method according to claim 9, wherein the means for stunning one or more poultry may include an electrical stunning, a percussive stunning, a chemical stunning, or a controlled atmosphere stunning.

* * * * *